United States Patent
Kiyosawa et al.

(10) Patent No.: US 11,168,775 B2
(45) Date of Patent: Nov. 9, 2021

(54) UNIT-TYPE STRAIN WAVE GEARING

(71) Applicant: HARMONIC DRIVE SYSTEMS INC., Tokyo (JP)

(72) Inventors: Yoshihide Kiyosawa, Azumino (JP); Norio Shirokoshi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 91 days.

(21) Appl. No.: 16/753,394

(22) PCT Filed: Sep. 20, 2018

(86) PCT No.: PCT/JP2018/034839
§ 371 (c)(1),
(2) Date: Apr. 3, 2020

(87) PCT Pub. No.: WO2020/059081
PCT Pub. Date: Mar. 26, 2020

(65) Prior Publication Data
US 2020/0284333 A1 Sep. 10, 2020

(51) Int. Cl.
*F16H 49/00* (2006.01)
*F16C 17/10* (2006.01)
*F16H 57/02* (2012.01)

(52) U.S. Cl.
CPC ......... *F16H 49/001* (2013.01); *F16C 17/10* (2013.01); *F16H 57/02* (2013.01); *F16C 2361/61* (2013.01)

(58) Field of Classification Search
CPC .................................................. F16H 49/001
(Continued)

(56) References Cited

U.S. PATENT DOCUMENTS 5,984,048 A * 11/1999 Kiyosawa ............ F16H 49/001
184/6.12
6,202,509 B1 * 3/2001 Dold .................... F16H 49/001
74/411
(Continued)

FOREIGN PATENT DOCUMENTS

JP 2000033878 A 2/2000
JP 2005291237 A 10/2005
(Continued)

OTHER PUBLICATIONS

International Search Report (PCT/ISA/210) and translation and Written Opinion (PCT/ISA/237) dated Dec. 18, 2018, by the Japanese Patent Office as the International Searching Authority for International Application No. PCT/JP2018/034839.

*Primary Examiner* — Ha Dinh Ho
(74) *Attorney, Agent, or Firm* — Buchanan Ingersoll & Rooney PC

(57) ABSTRACT

In a unit-type strain wave gearing, a rotating-side member, which is constituted by a second internally toothed gear and an output shaft is supported, via a first sliding bearing and a second sliding bearing, on a fixed-side member so as to be capable of relative rotation, the fixed-side member being constituted by a unit housing and a first internally toothed gear. Sliding bearing surfaces of the first sliding bearing and sliding bearing surfaces of the second sliding bearing are defined by a conic surface having a central axis line as a center line. It is possible to realize a unit-type strain wave gearing which is advantageous in making smaller and more compact than when a roller bearing is used. It is also easier to adjust the gap between the sliding bearing surfaces because a radial sliding bearing having no function to adjust the radial gap is obviated.

6 Claims, 3 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 6,220,115 | B1* | 4/2001 | Hirn ...................... | F16H 49/001 |
| | | | | 74/640 |
| 6,682,220 | B2* | 1/2004 | Kobayashi .............. | F16C 33/60 |
| | | | | 384/447 |
| 7,047,923 | B2* | 5/2006 | Schafer ................... | F01L 1/352 |
| | | | | 123/90.16 |
| 7,484,436 | B2* | 2/2009 | Kiyosawa ................ | F16C 19/52 |
| | | | | 184/6.12 |
| 8,384,260 | B2* | 2/2013 | Kanayama ............. | H02K 11/21 |
| | | | | 310/83 |

FOREIGN PATENT DOCUMENTS

| | | | |
|---|---|---|---|
| JP | 2005308131 | A | 11/2005 |
| JP | 2010014207 | A | 1/2010 |
| JP | 2010242585 | A | 10/2010 |
| JP | 2015169256 | A | 9/2015 |
| JP | 2016023724 | A | 2/2016 |

* cited by examiner

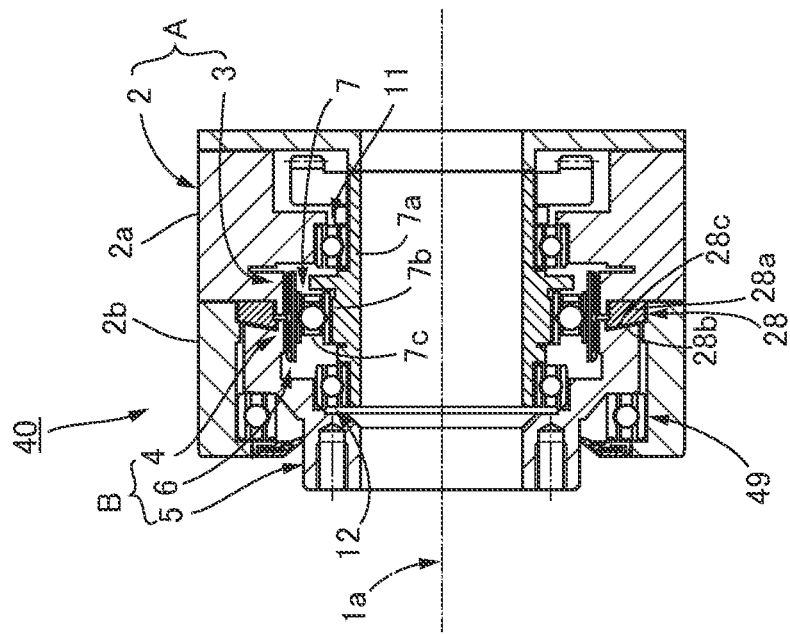
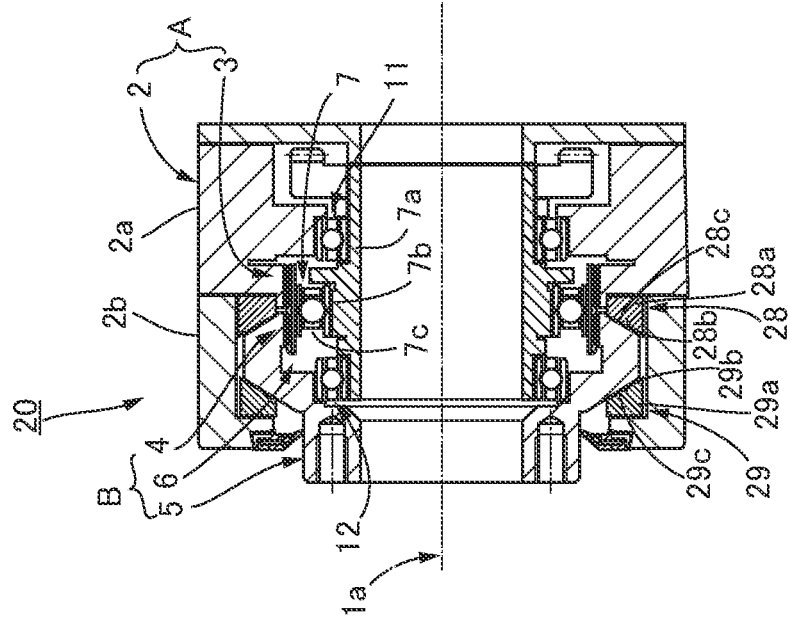

UNIT-TYPE STRAIN WAVE GEARING

TECHNICAL FIELD

The present invention relates to a unit-type strain wave gearing provided with a sliding bearing that supports a rigid internally toothed gear and a flexible externally toothed gear such that the two gears are capable of relative rotation.

BACKGROUND ART

A unit-type strain wave gearing is provided with: a unit housing in which an internally toothed gear, an externally toothed gear, and a wave generator are incorporated; a bearing that supports the internally toothed gear and the externally toothed gear such that the two gears are capable of relative rotation; and an output member to which reduced rotation is outputted. In a unit-type strain wave gearing, a cross roller bearing, a four-point contact ball bearing, or another rolling bearing is used as the bearing as is stated in Patent Documents 1 and 2.

PRIOR ART DOCUMENTS

Patent Documents

Patent Document 1: JP 2005-291237 A
Patent Document 2: JP 2005-308131 A

SUMMARY OF THE INVENTION

Problems to be Solved by the Invention

In unit-type strain wave gearings, integrally forming the unit housing in an outer race of a rolling bearing is an example of a measure adopted in order to make the gearing more compact and reduce the number of components. One approach that has been considered is to use a sliding bearing instead of a rolling bearing, whereby a unit-structured strain wave gearing could be made even smaller and more compact than when using a rolling bearing. The inventors have proposed a unit-structured strain wave gearing provided with a sliding bearing in International Patent Application No. PCT/JP2017/39444 (filing date: 31 Oct. 2017).

When a sliding bearing is used, both a radial sliding bearing and a thrust sliding bearing are arranged in order to bear a radial load and a thrust load generated between the internally toothed gear and the externally toothed gear. Since radial sliding bearings are not provided with a gap-adjustment mechanism, the sections constituting the radial sliding bearing are machined more precisely, and the radial sliding bearing is assembled more precisely.

It is an object of the present invention is to provide a lightweight and compact unit-type strain wave gearing provided with a sliding bearing in which gap adjusting is easily performed.

Means of Solving the Problems

In the unit-type strain wave gearing of the present invention, a sliding bearing is used instead of a rolling bearing as a bearing that supports a rigid internally toothed gear and a flexible externally toothed gear such that the two gears are capable of relative rotation. A sliding bearing surface of the sliding bearing is inclined relative to a center axis line of the unit-type strain wave gearing, whereby a radial sliding bearing is obviated and gap adjustment is facilitated.

Specifically, a unit-type strain wave gearing of the present invention is characterized by having:

a rigid internally toothed gear;

a flexible externally toothed gear capable of meshing with the internally toothed gear;

a wave generator that causes the flexible externally toothed gear to flex into a non-circular shape and partially mesh with the internally toothed gear;

a cylindrical unit housing to which a first gear is attached, the first gear being either one of the internally toothed gear and the externally toothed gear;

an output member to which a second gear is attached, the second gear being the other one of the internally toothed gear and the externally toothed gear; and a sliding bearing configured such that a fixed-side member, which comprises the unit housing and the first gear, and a rotating-side member, which comprises the output member and the second gear, are supported so as to be capable of relative rotation, the sliding bearing being provided with a fixed-side sliding bearing surface formed on the fixed-side member and a rotating-side sliding bearing surface that is formed on the rotating-side member and slidably contacts the fixed-side sliding bearing surface;

the fixed-side sliding bearing surface being defined by a conic surface of which a center line is a center axis line of the unit housing; and the rotating-side sliding bearing surface being defined by a conic surface oriented in reverse of the fixed-side sliding bearing surface.

A self-lubricating sliding bearing can be used as the sliding bearing. For example, it is possible to use a sliding bearing configured such that an annular bearing bush on which the fixed-side sliding bearing surface is formed is mounted on the fixed-side member. There are also cases in which a pair of sliding bearings are arranged between the fixed-side member and the rotating-side member. A sliding bearing and a rolling bearing can also be used in place of the pair of sliding bearings. For example, a deep groove ball bearing is used as the rolling bearing.

A sliding bearing provided with a sliding bearing surface inclined in relation to the center axis line can bear both a thrust load and a radial load. There are cases in which it is easier to make a unit-type strain wave gearing smaller and more compact than when a thrust sliding bearing and a radial sliding bearing are arranged. Additionally, it is easier to adjust the gap between the sliding bearing surfaces than in the case of arranging a radial sliding bearing having no function to adjust the radial gap.

The unit housing, the internally toothed gear, and the output member can each be fabricated from any one of the following materials: steel, light alloys, ceramics, and plastics. The weight of the device is reduced by manufacturing these components from aluminum alloys, magnesium alloys, or other light alloys; plastics; or other materials that are lighter in weight than iron-based materials.

In this case, the surface portions on which the sliding bearing surfaces are formed are plated surfaces subjected to hard plating, solid lubricant plating, etc. The required surface hardness, wear/friction resistance, lubrication, and other characteristics can thereby be ensured.

BRIEF DESCRIPTION OF THE DRAWINGS

FIG. 3 is a longitudinal cross-sectional view of a unit-type strain wave gearing of Embodiment 2; and FIG. 4 is a longitudinal cross-sectional view of Embodiment 3.

MODE FOR CARRYING OUT THE INVENTION

Embodiments of a unit-type strain wave gearing to which the present invention is applied are described below with reference to the drawings. The embodiments below are examples of cases in which the present invention is applied to a flat-type strain wave gearing. The present invention can be similarly applied to a cup-type strain wave gearing provided with a cup-shaped externally toothed gear, and a top-hat-type strain wave gearing provided with a top-hat-shaped externally toothed gear. In the unit-type strain wave gearings of the embodiments, a flexible externally toothed gear is made to flex into an ellipsoidal shape by a wave generator and meshes with a rigid internally toothed gear, simultaneously in two locations along a circumferential direction. The present invention can be similarly applied to a strain wave gearing having a structure in which an externally toothed gear is made to flex into a three-lobe form and meshes with an internally toothed gear in three locations simultaneously.

Embodiment 1

Figure 1B:
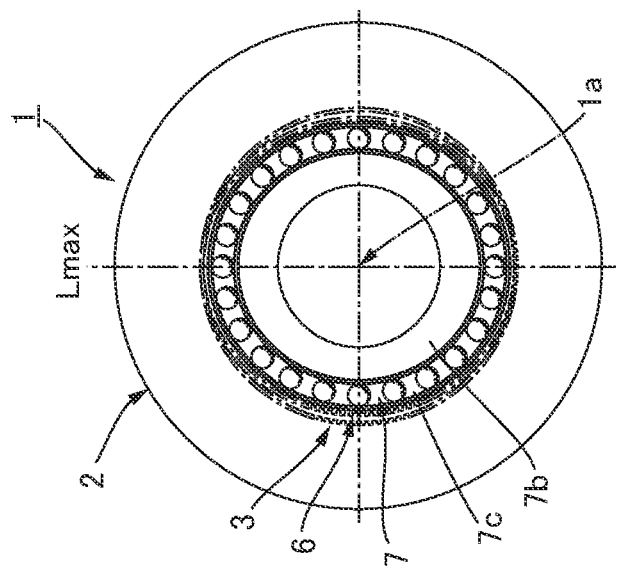
FIG. 1B is a schematic transverse cross-sectional view of a portion sectioned along line 1B-1B in FIG. 1A.
Figure 1A:
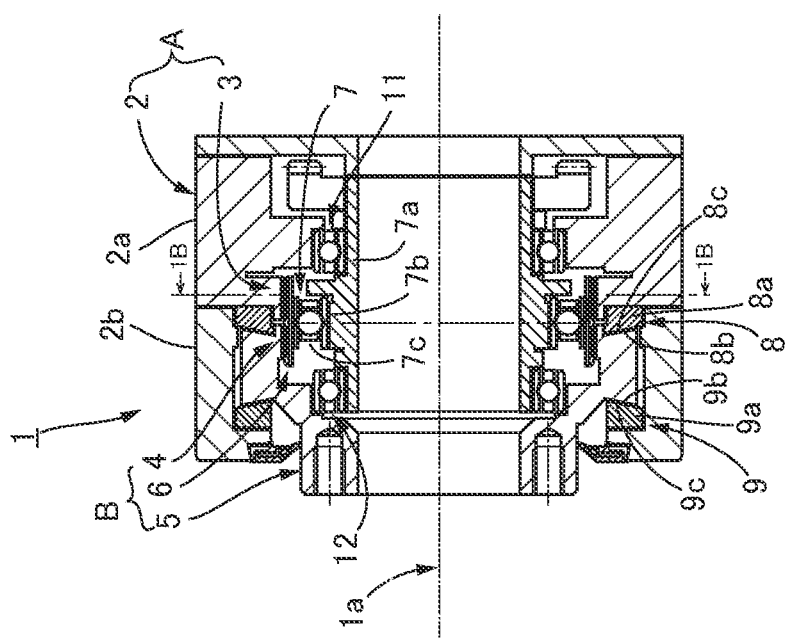
FIG. 1A is a longitudinal cross-sectional view of a unit-type strain wave gearing of Embodiment 1.

FIG. 1A is a longitudinal cross-sectional view of a unit-type strain wave gearing according to Embodiment 1. FIG. 1B is a schematic transverse cross-sectional view of a portion sectioned along line 1B-1B in FIG. 1A, and shows the externally toothed gear in a meshing state with the internally toothed gear. A unit-type strain wave gearing 1 (referred to below simply as the "strain wave gearing 1") is provided with a cylindrical unit housing 2. The unit housing 2 is configured from, for example, a cylindrical first housing 2a and a cylindrical second housing 2b which are coaxially fastened and fixed from the direction of a center axis line 1a.

A rigid first internally toothed gear 3 and a rigid second internally toothed gear 4 are arranged inside the unit housing 2. The first and second internally toothed gears 3, 4 are coaxially arranged in parallel along the direction of the center axis line 1a. The one first internally toothed gear 3 is formed integrally with the first housing 2a of the unit housing 2. The first housing 2a and the first internally toothed gear 3 may be fabricated as separate components and the first internally toothed gear 3 may be coaxially fixed to the first housing 2a. A cylindrical output shaft 5 is formed integrally with the other second internally toothed gear 4. The second internally toothed gear 4 and the output shaft 5 may be fabricated as separate components and coaxially fixed together. A flexible externally toothed gear 6 is coaxially arranged on inner sides of the first and second internally toothed gears 3, 4. An ellipsoidally contoured wave generator 7 is coaxially arranged on an inner side of the externally toothed gear 6.

The unit housing 2 and the first internally toothed gear 3 constitute a fixed-side member A fastened and fixed to an attachment part (not shown). The externally toothed gear 6, the second internally toothed gear 4 (rotating-side internally toothed gear), and the output shaft 5 constitute a rotating-side member B. The rotating-side member B is supported so as to be capable of relative rotation by the fixed-side member A, via a first sliding bearing 8 and a second sliding bearing 9 arranged a gap apart along the direction of the center axis line 1a. The wave generator 7 is rotatably supported by the unit housing 2 via a main bearing or another first rolling bearing 11 at one side along the direction of the center axis line 1a, and is supported so as to be capable of rotating relative to the output shaft 5 via a main bearing or another second rolling bearing 12 at the other side.

The wave generator 7 is configured from a hollow input shaft 7a, an ellipsoidally contoured rigid plug 7b having a fixed width and being formed integrally with an outer peripheral surface of the hollow input shaft 7a, and a wave bearing 7c mounted on an ellipsoidal outer peripheral surface of the rigid plug 7b. The outer peripheral surface portions of the hollow input shaft 7a on both sides of the rigid plug 7b are supported by the first and second rolling bearings 11, 12. For example, a gear for rotation input is fixed to the hollow input shaft 7a, and high-speed rotation from a motor, etc., is inputted to the wave generator 7.

The externally toothed gear 6 is made to flex into an ellipsoidal shape by the wave generator 7, and meshes with both of the first and second internally toothed gears 3, 4 at positions of a major axis Lmax of the ellipsoidal shape. The first internally toothed gear 3 and the externally toothed gear 6 have different numbers of teeth, and the second internally toothed gear 4 and the externally toothed gear 6 have the same number of teeth. When the wave generator 7 rotates, the externally toothed gear 6 rotates relative to the fixed-side first internally toothed gear 3. The second internally toothed gear 4, which has the same number of teeth as the externally toothed gear 6, rotates integrally with the externally toothed gear 6. Reduced rotation is outputted from the output shaft 5, which is formed integrally with the externally toothed gear 6.

Next, the first sliding bearing 8 shall be described. The first sliding bearing 8 is provided with a first bearing bush 8a, a first fixed-side sliding bearing surface 8b formed on the first bearing bush 8a, and a first rotating-side sliding bearing surface 8c that slidably contacts the first fixed-side sliding bearing surface 8b. A cylindrical recess opening inward is formed in an inner peripheral surface of the unit housing 2 in the fixed-side member A. In an inside end surface portion of the recess where the first internally toothed gear 3 is formed, the first bearing bush 8a is mounted from the direction of the center axis line 1a. The first bearing bush 8a is mounted to this portion with a shim plate (not shown) for gap adjustment sandwiched therebetween as necessary. An annular end surface of the first bearing bush 8a on the second sliding bearing 9 side thereof is the first fixed-side sliding bearing surface 8b defined by a conic surface having the center axis line 1a as a center line. A bearing angle θ is 0<θ<90°, and an angle of inclination relative to the center axis line 1a is (90°−θ).

In the rotating-side member B, the first rotating-side sliding bearing surface 8c is formed in an end surface portion of the second internally toothed gear 4 formed integrally with the output shaft 5. The first rotating-side sliding bearing surface 8c is defined by a conic surface having a shape complementary to that of the first fixed-side sliding bearing surface 8b and is in sliding contact with the first fixed-side sliding bearing surface 8b.

The second sliding bearing 9 is provided with a second bearing bush 9a, a second fixed-side sliding bearing surface 9b formed on the second bearing bush 9a, and a second rotating-side sliding bearing surface 9c in sliding contact with the second fixed-side sliding bearing surface. In a recess formed in an inner peripheral surface portion of the unit housing 2 in the fixed-side member A, the second bearing bush 9a is mounted from the direction of the center axis line 1a on an inside end surface portion on the side opposite from the first internally toothed gear 3. The second bearing bush 9a is also mounted to this portion with a shim plate (not shown) for gap adjustment sandwiched therebetween as necessary. An annular end surface of the second bearing bush 9a on the first bearing bush 8a side thereof is the second fixed-side sliding bearing surface 9b defined by a conic surface having the center axis line 1a as a center line. In the present example, the second fixed-side sliding bearing surface 9b is a conic surface oriented in reverse from the first fixed-side sliding bearing surface 8b, and is inclined at the same angle as the first fixed-side sliding bearing surface 8b but in the opposite direction.

In the rotating-side member B, the second rotating-side sliding bearing surface 9c is formed in an end surface portion of the output shaft 5 on the side opposite the second internally toothed gear 4. The second rotating-side sliding bearing surface 9c is defined by a conic surface having a shape complementary to that of the second fixed-side sliding bearing surface 9b and is in sliding contact with the second fixed-side sliding bearing surface 9b.

As described above, in the strain wave gearing 1, first and second sliding bearings 8, 9, which are provided with sliding bearing surfaces inclined at a predetermined angle in relation to the center axis line 1a, are arranged as bearings supporting the fixed-side member A and the rotating-side member B so as to allow these members to rotate relative to each other. The first and second sliding bearings 8, 9 respectively bear a radial load and a thrust load. A radial sliding bearing with no gap adjustment function is obviated and adjusting the gap of the sliding bearing surfaces is facilitated.

The unit housing 2, the first internally toothed gear 3, the second internally toothed gear 4, the externally toothed gear 6, the hollow input shaft 7a and rigid plug 7b of the wave generator 7, and the output shaft 5 can each be fabricated from any one of the following materials: steel, light alloys, ceramics, and plastics. When these components are manufactured from light alloys, plastics, or other materials, the device is made lighter in weight.

In the rotating-side member B, there are cases in which the hardness, wear/friction properties, lubrication, and other characteristics of the surface portions on which the first and second rotating-side sliding bearing surfaces 8c, 9c of the first and second sliding bearings 8, 9 are formed do not meet the required levels. In such cases, hard plating, solid lubricant dispersion plating, or another surface treatment is carried out on these surface portions. The desired surface hardness, wear/friction resistance, and lubrication can be imparted by carrying out a surface treatment.

Bearing Angles of Sliding Bearings

Figures 2A, 2B:
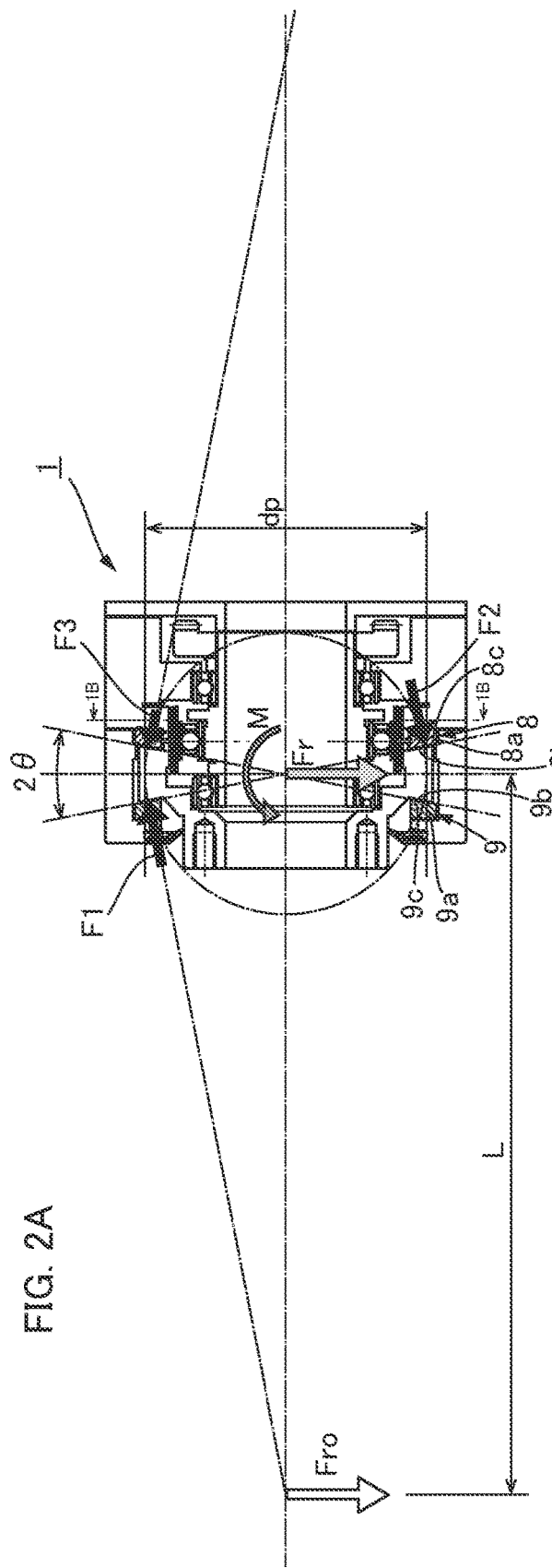
FIG. 2A is an explanatory drawing of forces acting on sliding bearings of the unit-type strain wave gearing of FIG. 1A.
FIG. 2B is an explanatory drawing of forces acting on sliding bearings in a unit-type strain wave gearing (comparative device) provided with thrust sliding bearings and a radial sliding bearing.

FIG. 2A is an explanatory drawing of loads generated in the first and second sliding bearings 8, 9 when an external load (radial load) is exerted in the strain wave gearing 1 of the present example. FIG. 2B is an explanatory drawing of loads generated in the bearings when an external load is exerted on a unit-type strain wave gearing (referred to below as a "comparative device") provided with a radial sliding bearing and a pair of thrust sliding bearings.

A configuration of the comparative device (unit-type strain wave gearing) shown in FIG. 2B shall be described in a simple manner. A comparative device 100 is provided with a cylindrical unit housing 122, a first internally toothed gear 133 and second internally toothed gear 134 arranged on an inner side of the unit housing, a cylindrical externally toothed gear 136 arranged on inner sides of the first and second internally toothed gears 133, 134, a wave generator 137 arranged on an inner side of the externally toothed gear 136, and an output shaft 135 that rotates integrally with the second internally toothed gear 134. The unit housing 122 and the first internally toothed gear 133 constitute a fixed-side member, and the second internally toothed gear 134 and the output shaft 135 constitute a rotating-side member. A radial sliding bearing 128 and a pair of thrust sliding bearings 129, 130 are mounted between the fixed-side member and the rotating-side member. The rotating-side member is supported by the fixed-side member via these sliding bearings 128, 129, 130 so as to be capable of relative rotation.

The symbols in FIGS. 2A and 2B are listed below.

Fro: external load (radial load) (N)
L: distance (mm) from bearing center
dp: pitch (mm) of bearing
M: moment load (N·M)
Fr (=Fro): radial load (N) acting on bearing center
F1, F2, F3: bearing load (N)
θ: bearing angle (deg)
F11, F12, F13: bearing load (N)

In the strain wave gearing 1 of the present example shown in FIG. 2A, the moment load M and the bearing loads F1, F2, F3 are determined according to the following formulas.

$$M = Fro \times L$$

$$F1 = M \times dp/\cos\theta + Fr/2 \sin\theta$$

$$F2 = M \times dp/\cos\theta$$

$$F3 = Fr/2 \sin\theta$$

In the comparative device 100 shown in FIG. 2B, the moment load M and the bearing loads F11, F12, F13 are determined according to the following formulas.

$$M = Fro \times L$$

$$F11 = M \times dp$$

$$F12 = Fr = Fro$$

$$F13 = F11$$

The bearing angle θ was changed in the strain wave gearing 1; the acting point (distance L) of the external load Fro (radial load) was changed in the strain wave gearing 1 and the comparative device 100; and the loads acting on the first and second sliding bearings 8, 9, the radial sliding bearing 128, and the thrust sliding bearings 129, 130 were calculated to make a comparative examination. When the external load Fro is in effect, the bearing load F1 is greatest in the strain wave gearing 1 of the present example, and the bearing load F12 is greatest in the comparative device 100 of FIG. 2B.

With the first and second sliding bearings 8, 9 of the strain wave gearing 1 of the present example, the bearing load F1 decreases as the bearing angle θ increases. Comparing the bearing load F12 of the comparative device 100 with the bearing load F1, at a bearing angle θ of approximately 30°, the bearing load F1 is substantially equal to the bearing load F12 of the comparative device 100 when the same external load Fro is in effect; when the bearing angle θ is less than 30°, the bearing load F1 is greater than the bearing load F2; and when the bearing angle θ exceeds 30°, the bearing load F1 is less than the bearing load F2. A change in the distance L of the load points affects the bearing load F2 in the strain wave gearing 1 of the present example and affects the bearing load F11 in the comparative device 100, but only very slightly affects the bearing load F1 in the strain wave gearing 1 of the present example and the bearing load F12 in the comparative device 100.

Thus, in the first and second sliding bearings 8, 9 of the strain wave gearing 1 of the present example, the bearing angle θ should be increased to reduce the bearing load F1, which is the maximum bearing load. For example, if the bearing angle θ is set to a value of about 30° or to a greater value, the bearing load F1 can be made to be about equal to or less than the level would be in a strain wave gearing provided with a radial sliding bearing and a pair of thrust sliding bearings, such as the comparative device 100.

However, when the bearing angle θ increases by too much in order to reduce the bearing load F1, it becomes difficult to machine the sliding bearing surfaces, etc. High precision is also needed to adjust the gaps between the sliding bearing surfaces. Taking these points into consideration, it is preferable that in the strain wave gearing 1 of the present example, the bearing angle θ of the first and second sliding bearings 8, 9 is set within the range 25°≤θ≤35°.

Embodiment 2

FIG. 3 is a longitudinal cross-sectional view of a strain wave gearing according to Embodiment 2 to which the present invention is applied. A strain wave gearing 20 of the present example has the same basic configuration of the strain wave gearing 1 shown in FIG. 1; therefore, the same symbols are used for corresponding parts and descriptions thereof are omitted. The strain wave gearing 20 is provided with a first sliding bearing 28 in place of the first sliding bearing 8 and a second sliding bearing 29 in place of the second sliding bearing 9.

The first sliding bearing 28 is provided with a first fixed-side sliding bearing surface 28b and a first rotating-side sliding bearing surface 28c defined by a conic surface oriented in reverse of the conic surface that defines the first fixed-side sliding bearing surface 8b and first rotating-side sliding bearing surface 8c of the first sliding bearing 8. The first fixed-side sliding bearing surface 28b is formed on an end surface of a first bearing bush 28a. Similarly, the second sliding bearing 29 is provided with a second fixed-side sliding bearing surface 29b and a second rotating-side sliding bearing surface 29c defined by a conic surface oriented in reverse of the conic surface that defines the second fixed-side sliding bearing surface 9b and second rotating-side sliding bearing surface 9c of the second sliding bearing 9. The second fixed-side sliding bearing surface 29b is formed on an end surface of a second bearing bush 29a. In this case as well, the bearing angle θ is preferably an angle within the range 25°≤θ≤35° and is even more preferably set to about 30°.

Embodiment 3

FIG. 4 is a longitudinal cross-sectional view of a strain wave gearing according to Embodiment 3 to which the present invention is applied. A basic configuration of a strain wave gearing 40 of the present example is the same as that of the strain wave gearing 20 shown in FIG. 3; therefore, the same symbols are used for corresponding parts and descriptions thereof are omitted. The strain wave gearing 40 is provided with a rolling bearing 49, e.g., a deep groove ball bearing in place of the second sliding bearing 29. Thus, one bearing can be a rolling bearing and the other bearing can be a sliding bearing. In this case as well, the bearing angle θ of the first sliding bearing 28 is preferably an angle within the range 25°≤θ≤35° and is even more preferably set to about 30°.

The invention claimed is:

1. A unit-type strain wave gearing comprising:
a rigid internally toothed gear;
a flexible externally toothed gear capable of meshing with the internally toothed gear;
a wave generator that causes the flexible externally toothed gear to flex into a non-circular shape and partially mesh with the internally toothed gear;
a cylindrical unit housing to which a first gear is attached, the first gear being either one of the internally toothed gear and the externally toothed gear;
an output member to which a second gear is attached, the second gear being the other one of the internally toothed gear and the externally toothed gear; and
a sliding bearing that supports a fixed-side member and a rotating-side member so as to be capable of relative rotation, the fixed-side member comprising the unit housing and the first gear, and the rotating-side member comprising the output member and the second gear,
the sliding bearing being provided with a fixed-side sliding bearing surface formed on the fixed-side member and a rotating-side sliding bearing surface that is formed on the rotating-side member and slidably contacts the fixed-side sliding bearing surface;
the fixed-side sliding bearing surface being defined by a conic surface of which a center line is a center axis line of the unit housing; and
the rotating-side sliding bearing surface being defined by a conic surface oriented in reverse of the fixed-side sliding bearing surface.

2. The unit-type strain wave gearing according to claim 1, wherein
the sliding bearing has an annular bearing bush mounted on the fixed-side member, and
the fixed-side sliding bearing surface is formed on the bearing bush.

3. The unit-type strain wave gearing according to claim 1, wherein
a first sliding bearing located at one side in a direction of the center axis line and a second sliding bearing located at the other side are provided as the sliding bearing, and
wherein the first sliding bearing is provided with a first fixed-side sliding bearing surface as the fixed-side bearing surface, and is provided with a first rotating-side sliding bearing surface as the rotating-side sliding bearing surface, and
the second sliding bearing is provided with a second fixed-side sliding bearing surface as the fixed-side bearing surface, and is provided with a second rotating-side bearing sliding surface as the rotating-side bearing surface, the second fixed-side sliding bearing surface being oriented in reverse of the first fixed-side sliding bearing surface, the second rotating-side sliding bearing surface being oriented in reverse of the first rotating-side sliding bearing surface.

4. The unit-type strain wave gearing according to claim 3, wherein the first sliding bearing is provided with a first bearing bush that has an annular shape and is mounted on the fixed-side member, the first fixed-side sliding bearing surface is formed on the first bearing bush, the second sliding bearing is provided with a second bearing bush that has an annular shape and is mounted on the fixed-side member, and the second fixed-side sliding bearing surface is formed on the second bearing bush.

5. The unit-type strain wave gearing according to claim 1, further comprising:

a rolling bearing that supports the fixed-side member and the rotating-side member so as to be capable of relative rotation, wherein the sliding bearing is arranged on one side in a direction along the center axis line, and the rolling bearing is arranged on the other side.

6. The unit-type strain wave gearing according to claim 1, further comprising:

an annular rotating-side internally toothed gear that is arranged coaxially and in parallel with the internally toothed gear and rotates integrally with the output member, wherein the internally toothed gear is the first gear that rotates integrally with the unit housing, and the externally toothed gear is the second gear;

the externally toothed gear is arranged on inner sides of the internally toothed gear and the rotating-side internally toothed gear, and is made to flex by the wave generator into a non-circular shape to mesh with the internally toothed gear and the rotating-side internally toothed gear, respectively;

the internally toothed gear and the externally toothed gear have different numbers of teeth so as to generate relative rotation between them as the wave generator rotates; and the externally toothed gear has a same number of teeth as that of the rotating-side internally toothed gear so as to rotate integrally with the rotating-side internally toothed gear as the wave generator rotates.

* * * * *